United States Patent
Chiku et al.

(10) Patent No.: US 8,780,897 B2
(45) Date of Patent: Jul. 15, 2014

(54) CROSS-CONNECT SYSTEM AND CROSS-CONNECT METHOD

(75) Inventors: Isao Chiku, Kawasaki (JP); Yukio Suda, Kawasaki (JP); Shiuji Sakakura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 125 days.

(21) Appl. No.: 13/405,530

(22) Filed: Feb. 27, 2012

(65) Prior Publication Data

US 2012/0219291 A1    Aug. 30, 2012

(30) Foreign Application Priority Data

Feb. 28, 2011    (JP) ................................ 2011-042361

(51) Int. Cl.
*H04L 12/50*    (2006.01)
(52) U.S. Cl.
USPC ........................................ 370/369; 370/360
(58) Field of Classification Search
USPC ......... 370/357–360, 364–366, 369, 370, 372, 370/375, 380, 466, 467
See application file for complete search history.

(56) References Cited

U.S. PATENT DOCUMENTS

| 7,639,678 | B2 * | 12/2009 | Beshai ........................ 370/369 |
| 2002/0081058 | A1 * | 6/2002 | Beisel et al. .................... 385/17 |
| 2003/0123493 | A1 * | 7/2003 | Takahashi ..................... 370/539 |
| 2007/0264015 | A1 * | 11/2007 | Li et al. ......................... 398/45 |

FOREIGN PATENT DOCUMENTS

JP    2003-188919    7/2003

* cited by examiner

*Primary Examiner* — Huy D Vu
*Assistant Examiner* — Kuo T Chiang
(74) *Attorney, Agent, or Firm* — Fujitsu Patent Center

(57) ABSTRACT

A cross-connect system includes a mapping unit that maps second signal frames on which cross-connection is performed with a space switch, into third signal frames on which cross-connection is performed with the space switch and a time switch; a selection unit that selects either first signal frames on which cross-connection is performed with the space switch and the time switch and corresponding clock signals, or the third signal frames and corresponding clock signals; a cross-connection unit that receives either the first signal frames and corresponding clock signals or the third signal frames and corresponding clock signals selected by the selection unit and performs cross-connection for either the first signal frames or the third signal frames; and a demapping unit that demaps the third signal frames output from the cross-connection unit into the second signal frames and output the second signal frames.

8 Claims, 16 Drawing Sheets

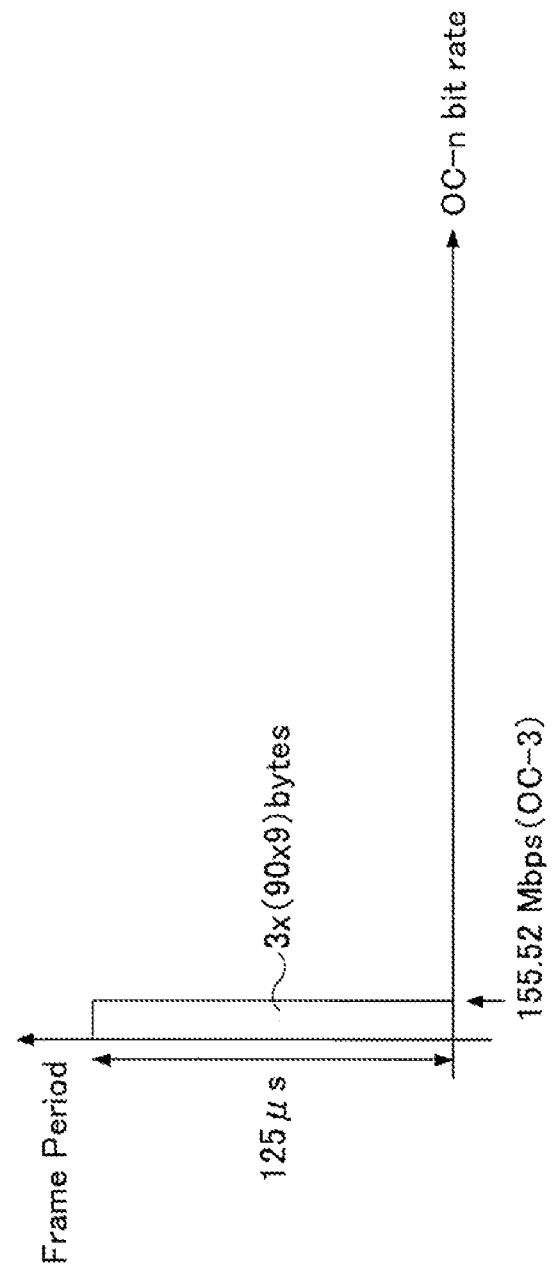

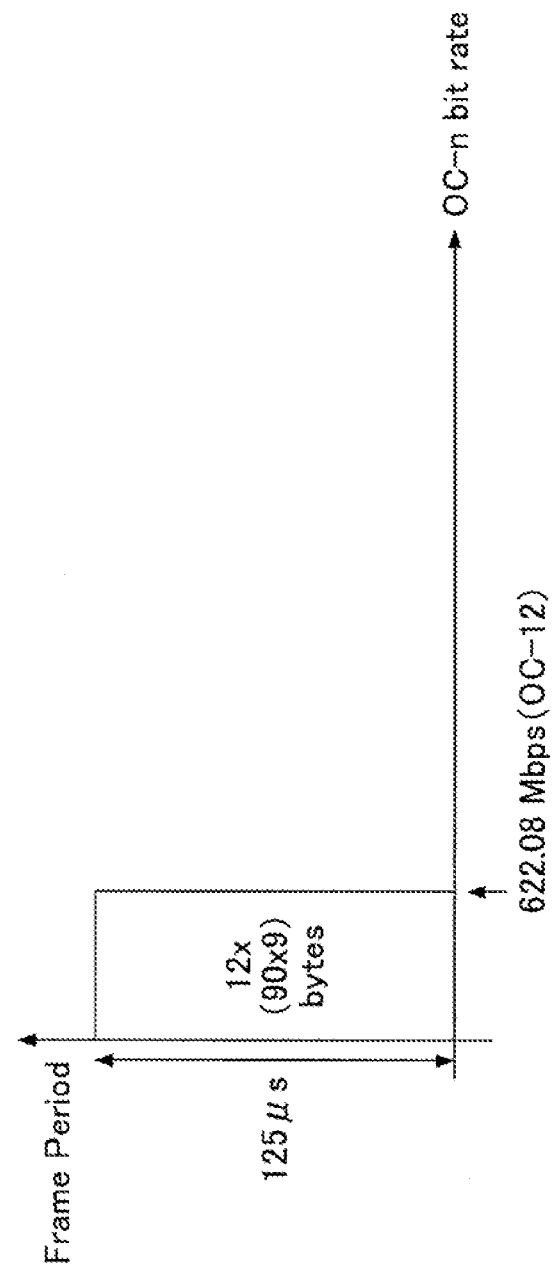

CROSS-CONNECT SYSTEM AND CROSS-CONNECT METHOD

CROSS-REFERENCE TO RELATED APPLICATION

This patent application is based upon and claims the benefit of priority of the prior Japanese Patent Application No. 2011-042361 filed on Feb. 28, 2011, the entire contents of which are incorporated herein by reference.

FIELD

The embodiments discussed herein are related to a cross-connect system and a cross-connect method for performing cross-connection on two different types of signal frames.

BACKGROUND

In recent years, an Optical Transport Network (OTN) has been standardized at ITU-T. OTN is based on the premise of wavelength-division multiplexing (WDM), with which the significant increase in Internet traffic can be accommodated. OTN has been standardized as a platform for performing transmission in a transparent manner. Specifically, in OTN transmission, an upper-level layer can totally disregard the lower-level layer, when transmitting client signals in end-to-end communication. Examples of client signals are those of a synchronous network such as Synchronous Optical Network (SONET) or Synchronous Digital Hierarchy (SDH), as well as those of an asynchronous network such as Internet Protocol (IP) or Ethernet (registered trademark). The interface and the frame format of OTN have been standardized as the ITU-T standard G.709, and are rapidly being installed in commercial systems. OTN uses an Optical channel Data Unit (ODU), in which overhead (OH) bytes used for connection and quality control are attached to the payload area of an Optical channel Payload Unit (OPU).

FIG. 1 illustrates an example of a conventional cross-connect system in which both SONET and ODU are used. First, a description is given of a flow of signals of SONET frames. SONET frames are input from terminals 1-1 through 1-n. Serial/parallel conversion is performed at high-speed interface (inf) units 2-1 through 2-n on the SONET input side. Accordingly, the speed is reduced in units of cross-connection processing (for example, 311.04 Mb/s×8 lines of parallel signals in the case of inputting 2.4 G). Next, low-speed inf units 3-1-1 through 3-n-m perform synchronization detection of SONET signals, transfer the SONET signals onto clock signals of the device, and align front positions of data for cross-connection performed in units of columns. The process of aligning the front positions of data is performed to facilitate the functions of interchanging channels and interchanging time slots in units of columns at a SONET cross-connect unit 4 at the subsequent stage.

At the SONET cross-connect unit 4, the data items whose front positions have been aligned are input. The SONET cross-connect unit 4 includes a space switch 4a and a time switch 4b. For example, a signal input from the terminal 1-1 (DATA IN 1) is switched, at the space switch 4a, to line 2 (DATA IN 2) according to a data switch control signal based on an output data switch request signal from a CPU 10, and the data is simultaneously latched. The latched data is switched once again by a data switch control signal at the time switch 4b at a time when all data items corresponding to one column are ready.

The data that is switched at the SONET cross-connect unit 4 is supplied to low-speed inf units 5-1-1 through 5-n-m, and SONET frames are regenerated. At high-speed inf units 6-1 through 6-n on the SONET output side, the SONET frames are parallel/serial converted to have the same SONET frame format as when the SONET frames had first been input to the terminals 1-1 through 1-n. The SONET frames are then output from the terminals 8-1 through 8-n through selectors (SEL) 7-1 through 7-n.

Next, a description is given of a flow of signals in ODU frames. ODU frames are input from the terminals 1-1 through 1-n, and are converted into ODU intermediate frames described below (164.42 Mb/s×40 parallel in the case of inputting 6.577 G), at high-speed inf units 12-1 through 12-n on the ODU input side and intermediate frame mapping units 13-1-1 through 13-n-k. The ODU intermediate frames are input to an ODU cross-connect unit 14. The ODU cross-connect unit 14 switches the ODU intermediate frames according to data switch signals based on output data switch request signals from the CPU 10. The ODU intermediate frames are switched only by a channel space switch 14a. The ODU cross-connect unit 14 does not have a time switch for interchanging time slots.

The data items switched at the ODU cross-connect unit 14 are ODU intermediate frames. Therefore, ODU frames are regenerated at intermediate frame demapping units 15-1-1 through 15-n-k. At high-speed inf units 16-1 through 16-n on the ODU output side, the ODU frames are parallel/serial converted to have the same ODU frame format as that when the ODU frames had first been input to the terminals 1-1 through 1-n. The ODU frames are then output from the terminals 8-1 through 8-n through selectors (SEL) 7-1 through 7-n.

As described above, in a conventional cross-connect system in which both SONET and ODU are used, SONET and ODU can coexist by having cross-connect units provided for the respective types of input signals.

Incidentally, the following technology of controlling and managing devices and networks is known. Specifically, an OTN cross-connect device constituting a second network is located at the boundary between a first network and the second network. In OTN frames of client interface cards installed in an OTN cross-connect device, SDH/SONET signals are stored in an incoherent manner. By using the overhead of OTN frames in the second network, devices and networks are controlled and managed (see, for example, patent document 1).

Patent document 1: Japanese Laid-Open Patent Publication No. 2003-188919

In a cross-connect system in which both SONET and ODU are used, SONET and ODU use different cross-connect units. In the case of SONET, the cross-connect unit is a TDM (Time Division Multiplexing) switch including a space switch and a time switch. In the case of ODU, the cross-connect unit includes only a space switch. SONET and ODU use different cross-connect units to implement the cross-connect function.

Furthermore, when SONET and ODU coexist in the same system, only one of the two formats is used selectively, and therefore an idle circuit exits. That is to say, the cross-connection functions are provided separately for SONET and ODU, but only one function is used at a time.

SUMMARY

According to an aspect of the present invention, a cross-connect system performs cross-connection for first signal frames and cross-connection for second signal frames. The cross-connect system includes a mapping unit configured to map the second signal frames into third signal frames on which cross-connection is performed in the same manner as the first signal frames; a selection unit configured to select either the first signal frames and clock signals of the first signal frames or the third signal frames and clock signals of the third signal frames; a cross-connection unit configured to receive either the first signal frames and the clock signals of the first signal frames or the third signal frames and the clock signals of the third signal frames selected by the selection unit and perform cross-connection for either the first signal frames or the third signal frames; and a demapping unit configured to demap the third signal frames output from the cross-connection unit into the second signal frames and output the second signal frames. The cross-connection for the first signal frames is performed with a space switch and a time switch. The cross-connection for the second signal frames is performed with the space switch.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 4A through 4C illustrate the relationship between the frame period and the signal speed in SONET;

DESCRIPTION OF EMBODIMENTS

Preferred embodiments of the present invention will be explained with reference to accompanying drawings.

Cross-Connect System According to First Embodiment

Figure 1:
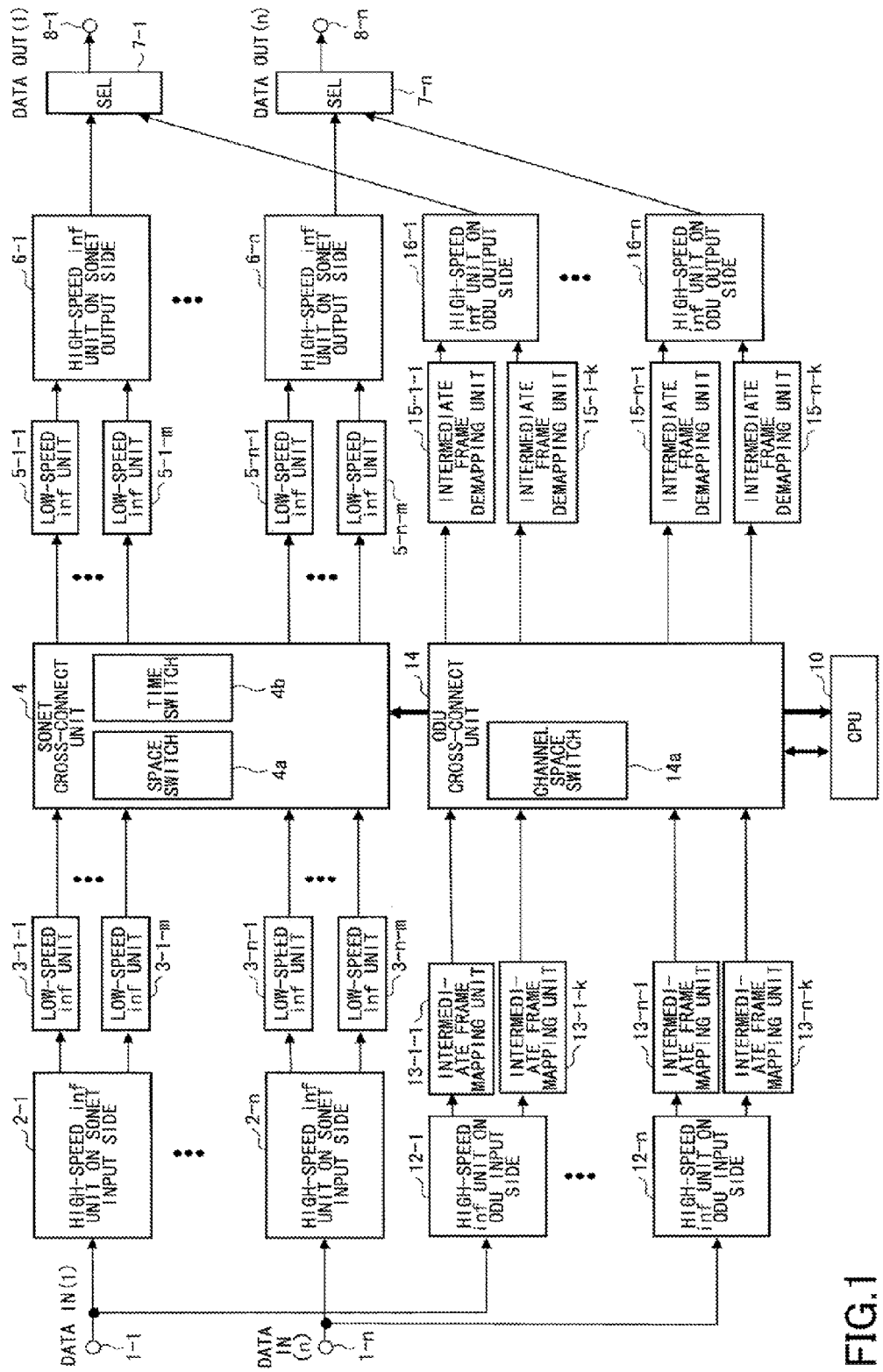
FIG. 1 illustrates an example of a conventional cross-connect system in which both SONET and ODU are used.
Figure 2:
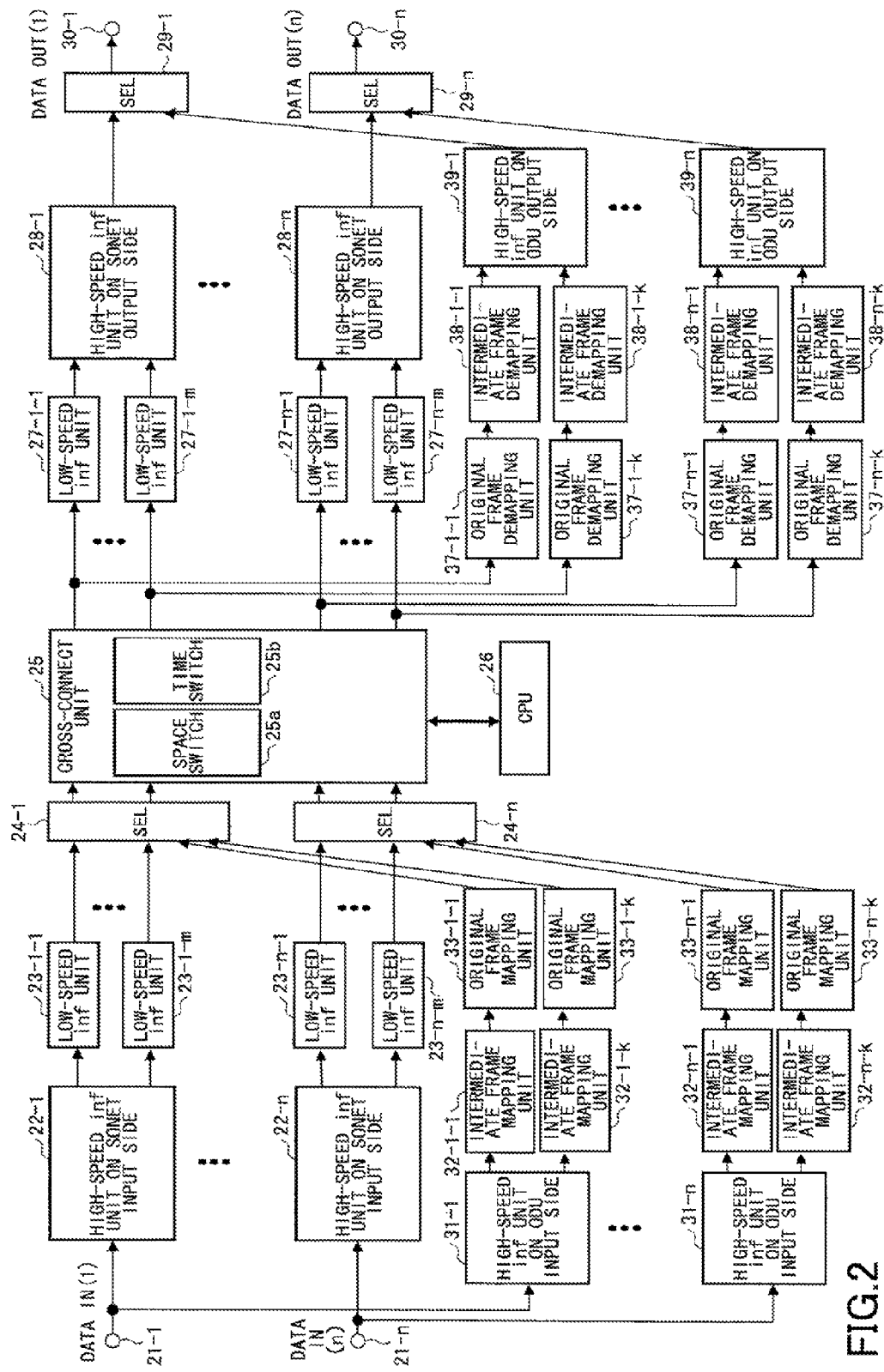
FIG. 2 illustrates an example of a cross-connect system according to a first embodiment in which both SONET and ODU are used.
Figure 3:
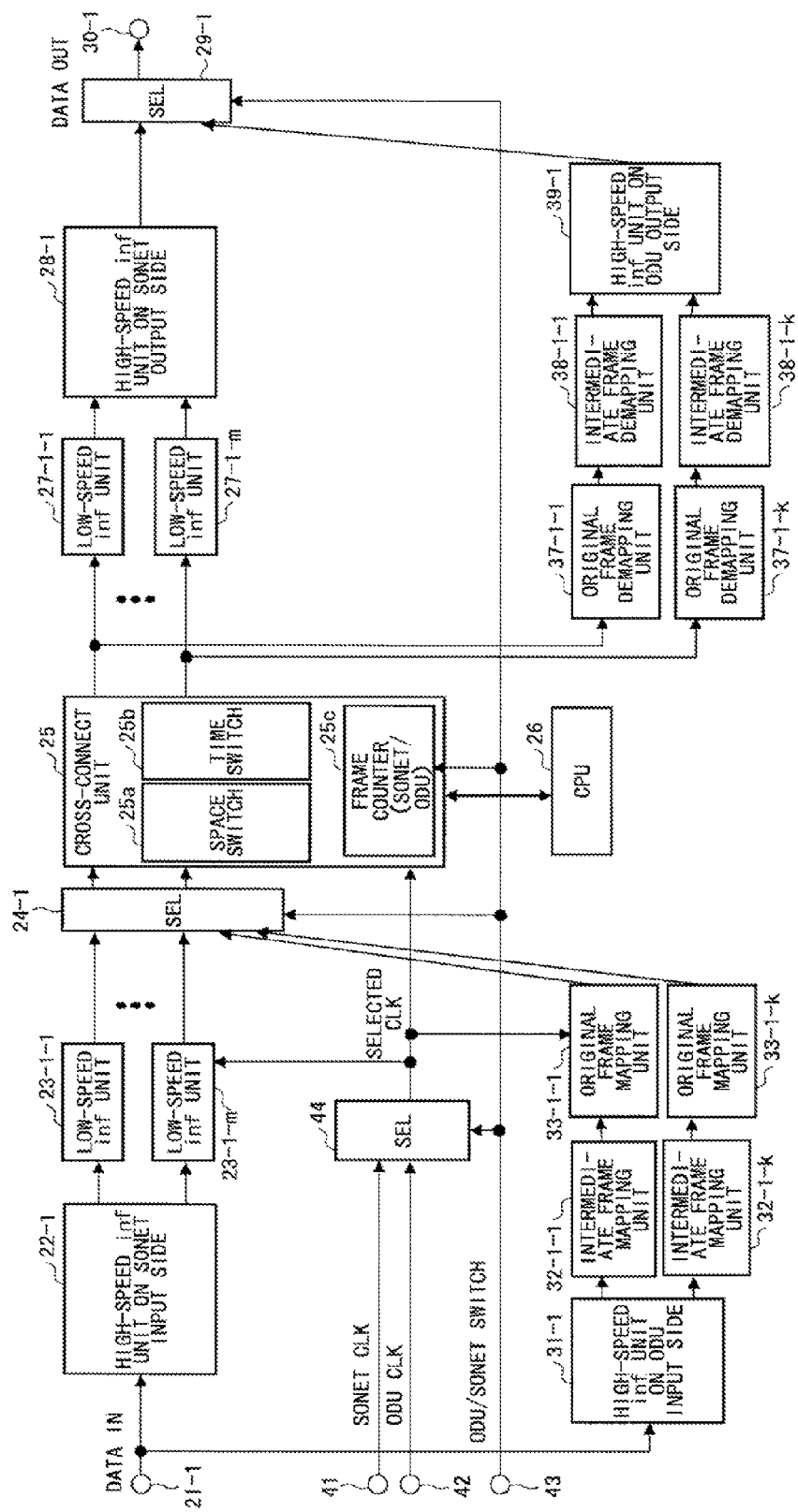
FIG. 3 illustrates a configuration of one input line in FIG. 2.

FIG. 2 illustrates an example of a cross-connect system according to a first embodiment in which both SONET and ODU are used. FIG. 3 illustrates a configuration of one input line in FIG. 2. In another example, SDH may be used instead of SONET.

A description is given of a flow of signals in SONET frames that are first signal frames. In FIG. 2, SONET frames (for example, STS-48) are input from terminals 21-1 through 21-$n$. At high-speed interface (inf) units 22-1 through 22-$n$ on the SONET input side, the SONET frames are parallel/serial converted. For example, STS-48 of 2.48832 Gb/s is converted into 8 lines of parallel signals of 311.04 Mb/s.

Next, low-speed inf units 23-1-1 through 23-$n$-$m$ perform synchronization detection of SONET frames, transfer the SONET frames onto clock signals of the device, and align the front positions of data for cross-connection performed in units of columns. The SONET frames output from the low-speed inf units 23-1-1 through 23-$n$-$m$ are supplied to a cross-connect unit 25 through selectors 24-1 through 24-$n$. The process of aligning the front positions of data is performed to facilitate the functions of interchanging channels and interchanging time slots in units of columns at the cross-connect unit 25 in the subsequent stage.

At the cross-connect unit 25, the data items whose front positions have been aligned are input. The cross-connect unit 25 includes a space switch 25$a$ and a time switch 25$b$. Space switch control and time switch control are performed on the input data in units of columns of 125 μs (clock signals of 311.04 MHz are frequency-divided by 1/388880), according to data switch control signals based on output data switch request signals from a CPU 26.

The data output from the cross-connect unit 25 is supplied to low-speed inf units 27-1-1 through 27-$n$-$m$, and SOH (Section Overhead)/LOH (Line Overhead) is regenerated and the data is transferred onto output side clock signals at 311.04 MHz. At high-speed inf units 28-1 through 28-$n$ on the SONET output side, the signals are parallel/serial converted to 2.48832 Gb/s signals of STS-48. Then, the converted signals are output from terminals 30-1 through 30-$n$ through selectors 29-1 through 29-$n$.

Next, a description is given of a flow of signals in ODU frames that are second signal frames. ODU 4 frames are input from the terminals 21-1 through 21-$n$, and are converted into ODU intermediate frames described below (164.42 Mb/s×40 parallel), at high-speed inf units 31-1 through 31-$n$ on the ODU input side and intermediate frame mapping units 32-1-1 through 32-$n$-$k$. At original frame mapping units 33-1-1 through 33-$n$-$k$, the ODU intermediate frames are converted in format to original frames that are third signal frames. The conversion into the original frame format is performed by mapping ODU intermediate frames (1 frame=93.42 μs, capacity=76800 bytes, clock frequency=164.42 MHz) into the payload area of original frames (1 frame=93.42 μs, capacity=93744 bytes, clock frequency=1.003468208 GHz). The original frames are supplied to the cross-connect unit 25 through the selectors 24-1 through 24-$n$.

The cross-connect unit 25 performs space switch control and time switch control in units of columns of 93.42 μs (clock signals of 164.42 MHz are frequency-divided by 1/93744), according to data switch signals based on output data switch request signals from the CPU 26.

The original frames output from the cross-connect unit 25 are supplied to original frame demapping units 37-1-1 through 37-$n$-$k$, and ODU intermediate frames are regenerated and the ODU intermediate frames are transferred onto output side clock signals at 164.42 MHz. At intermediate frame demapping units 38-1-1 through 38-$n$-$k$ and high-speed inf units 39-1 through 39-$n$ on the ODU output side convert the original frames into the DATA OUT (4) frame format, the frames are output from the terminals 30-1 through 30-n through the selectors 29-1 through 29-n.

In FIG. 3, SONET clock signals (311.04 MHz) input from a terminal 41 and ODU clock signals (1.003468208 GHz) input from a terminal 42 are supplied to a selector 44. ODU/SONET switch signals input from a terminal 43 are supplied to selectors 44, 24-1, and 29-1, and a frame counter 25c in the cross-connect unit 25. In FIG. 2, the selector 44 is not illustrated.

When SONET is selected according to ODU/SONET switch signals, the selector 44 selects SONET clock signals and supplies the SONET clock signals to the low-speed inf units 23-1-1 through 23-n-m, the original frame mapping units 33-1-1 through 33-n-k, and the cross-connect unit 25. When ODU is selected according to ODU/SONET switch signals, the selector 44 selects ODU clock signals and supplies the ODU clock signals to the low-speed inf units 23-1-1 through 23-n-m, the original frame mapping units 33-1-1 through 33-n-k, and the cross-connect unit 25.

Figure 4C:
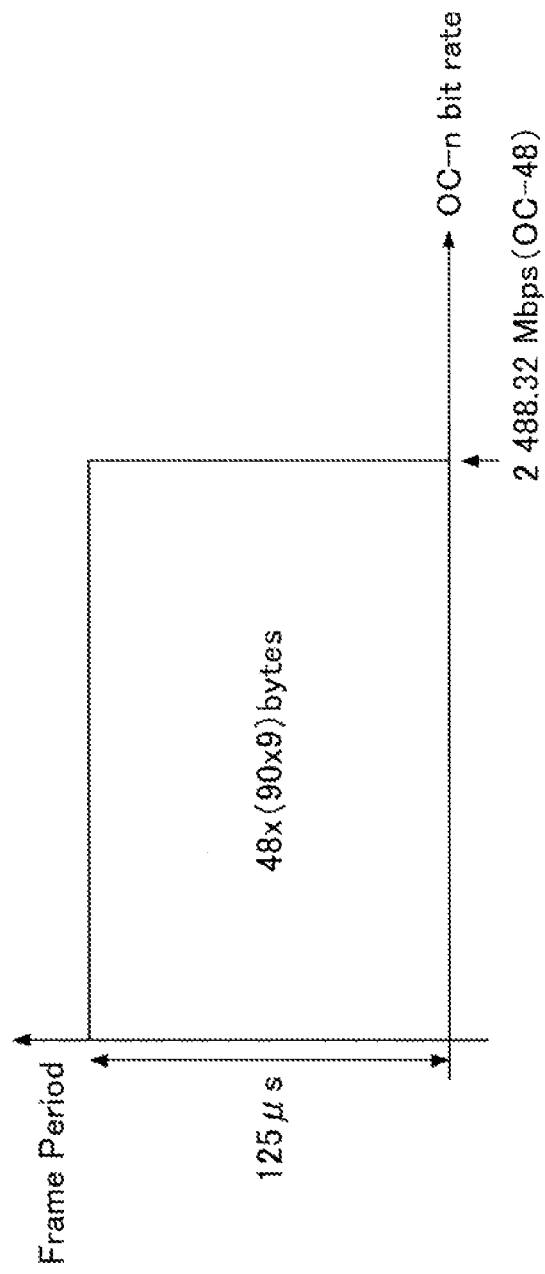

With reference to FIGS. 4A through 4C, a description is given of the relationship between the frame period and the signal speed of SONET. FIG. 4A indicates the relationship between the frame period and the signal speed in OC-3 (Optical Carrier-level 3), FIG. 4B indicates the relationship between the frame period and the signal speed in OC-12, and FIG. 4C indicates the relationship between the frame period and the signal speed in OC-48. In FIGS. 4A through 4C, the vertical axis indicates the frame period and the horizontal axis indicates the signal speed.

As illustrated in FIGS. 4A through 4C, the size of the frame of OC-n changes according to n. Specifically, the size of the frame of OC-n is n×90×9 bytes. Furthermore, as described above, in SONET/SDH, the frame period does not depend on the value of n, and is fixed at 125 μs. Thus, the signal speed of OC-n is n×51.84 Mbps.

Figure 5:
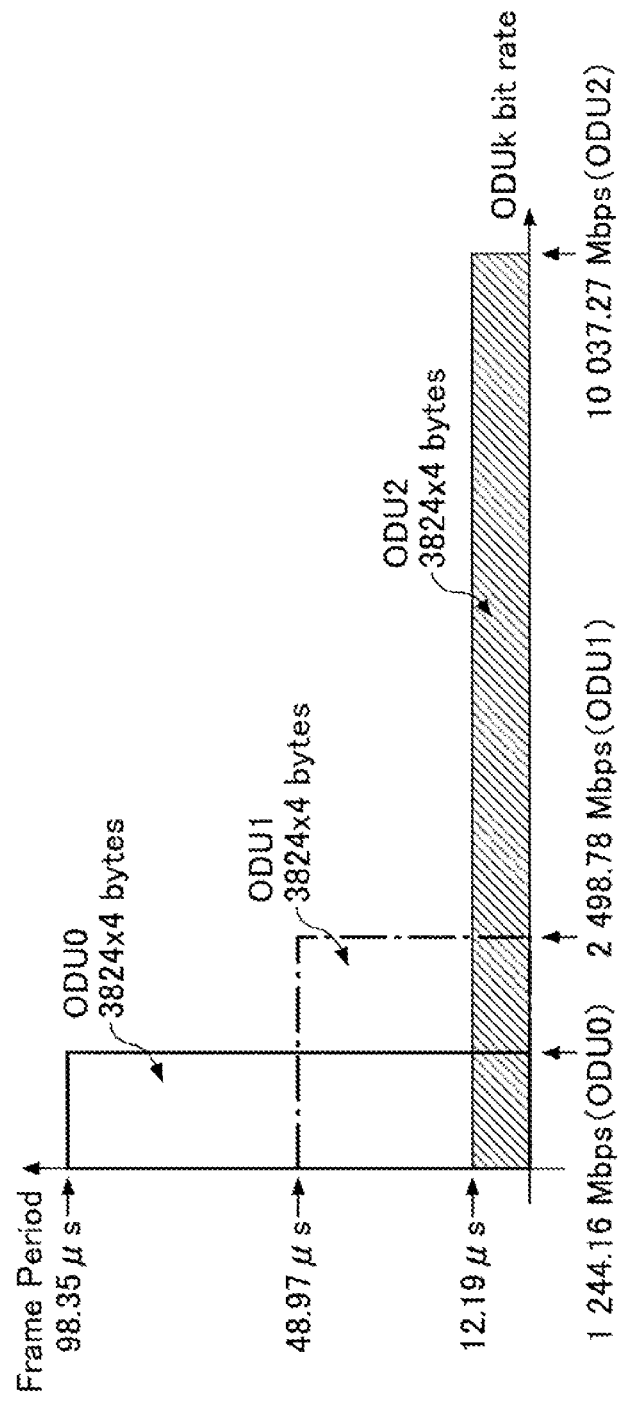
FIG. 5 is for describing the relationship between the frame period and the signal speed of ODUk.

Meanwhile, the frame structure of ODUk (Optical Channel Data Unit k) in OTUk (Optical Transport Unit k) specified in OTN is equivalent to OTUk, except for FEC (Forward Error Correction) and OH (Overhead). With reference to FIG. 5, a description is given of the relationship between the frame period and the signal speed of ODUk. In FIG. 5, the vertical axis indicates the frame period and the horizontal axis indicates the signal speed. FIG. 5 indicates the relationship between the frame period and the signal speed for ODU0, ODU1, and ODU2.

As illustrated in FIG. 5, the size of the frame of ODUk is 3824×4 bytes, regardless of the value of k. Meanwhile, the frame period of ODUk varies depending on the value of k. For example, the frame period of ODU0 is 98.35 μs, the frame period of ODU1 is 48.97 μs, and the frame period of ODU2 is 12.19 μs. Thus, the signal speed of ODUk varies depending on the value of k.

The signal speed of ODU0 is 1244.16 Mbps. The signal speed of ODU1 is 2498.78 Mbps (=1244.16×2×239/238 Mbps). The signal speed of ODU2 is 10037.27 Mbps (=1244.16×8×239/237 Mbps). Although not illustrated, the signal speed of ODU3 is 40319.22 Mbps (=1244.16×32×239/236 Mbps). The signal speed of ODU4 is 104794.45 Mbps (=1244.16×80×239/227 Mbps).

As described above, the frame period of OC-n in SONET is 125 μs regardless of the value of n. Thus, in order to implement cross-connection of outputting data signals to another path in OC-n by the TDM method, a plurality of cross-connection devices having a reference signal speed (for example, OC-1) are to be connected to each other.

Meanwhile, in OTN, even if the frame period of ODUk (k≥1) is multiplied by an integer, the frame period does not reach 98.35 μs that is the frame period of ODU0. Thus, in ODUk, it is not possible to implement cross-connection by the TDM method by connecting together a plurality of cross-connection devices having a reference signal speed (for example, ODU0).

Accordingly, in the present embodiment, by using the high-speed inf units on the ODU input side and the intermediate frame mapping units, the ODUk frames are mapped into common ODU intermediate frames in which the frame period, the frame format, and the signal speed are fixed.

The high-speed inf units 31-1 through 31-n on the ODU input side remove the overhead and FEC from the input OTUk signals. By removing the overhead and FEC from the input OTUk signals, ODUk signals are generated. The generated ODUk signals are supplied to the intermediate frame mapping units 32-1-1 through 32-n-k. The intermediate frame mapping units 32-1-1 through 32-n-k extract clock signals from the input network signals and client signals. Furthermore, when ODUj signals having a lower signal speed than ODUk signals (j<k) are multiplexed into the ODUk signals, the intermediate frame mapping units 32-1-1 through 32-n-k extract ODUj signals from the ODUk signals. Then, the intermediate frame mapping units 32-1-1 through 32-n-k use predetermined clock signals as a reference to map ODU signals into one or more ODU intermediate frames in which the frame period and signal speed are fixed. The ODU intermediate frames correspond to ODU0. In the overhead of an ODU intermediate frame, Justification Overhead (JC1 through JC6) is stored as information indicating the data amount or stuff amount included in the ODU intermediate frame. Furthermore, the mapping of the ODU intermediate frames is performed with the GMP (Generic Mapping procedure) method. The GMP method is for mapping data in frames having different signal speeds. By evenly distributing the valid data and stuff bytes in the payload area, the difference in the signal speed between the payload area in the frame of the mapping source and the payload area in the frame of the mapping destination is adjusted by stuff.

ODU Intermediate Frames

Figure 6:
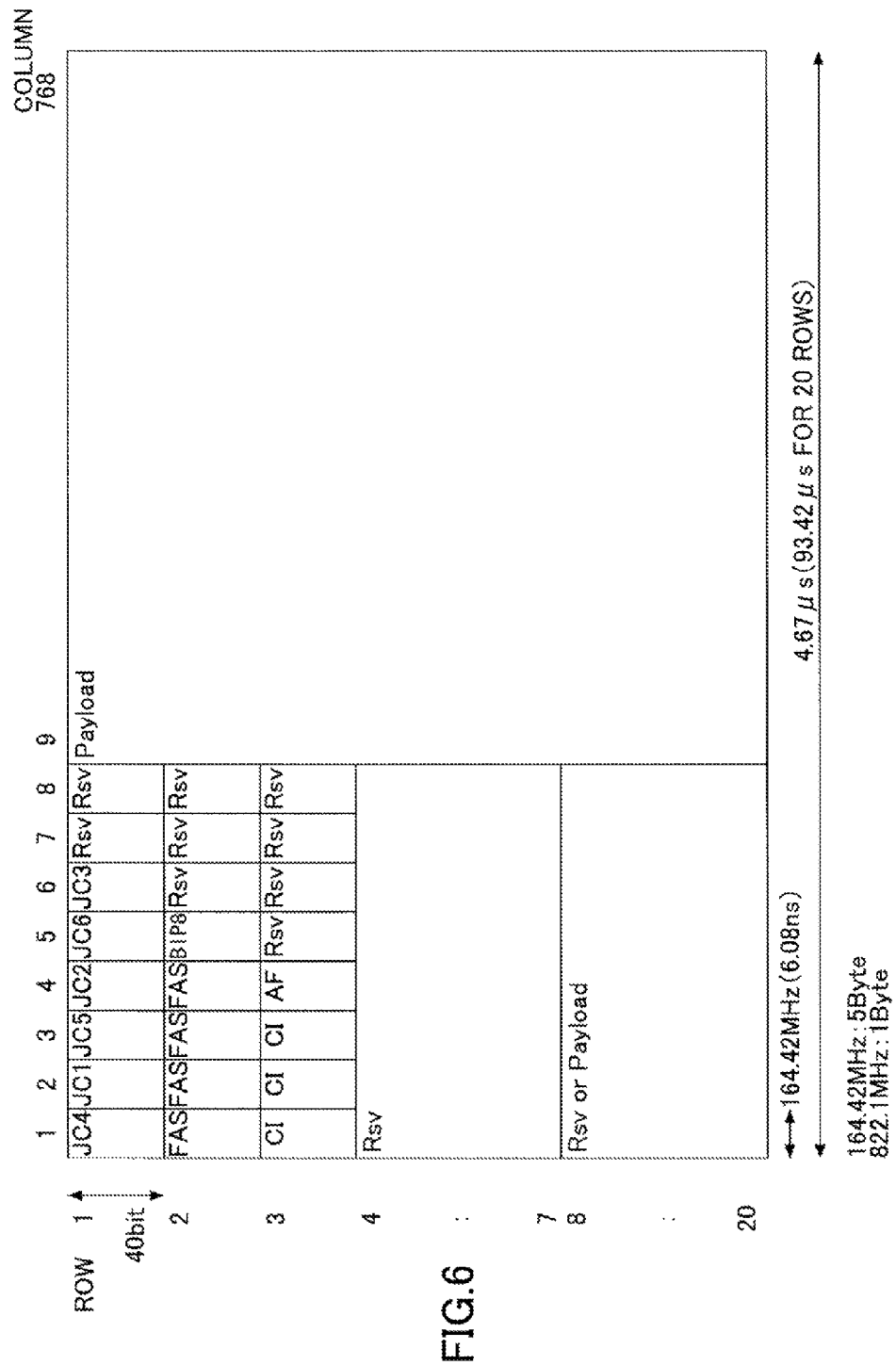
FIG. 6 illustrates a frame format of an ODU intermediate frame according to one embodiment.

FIG. 6 illustrates a frame format of an ODU intermediate frame according to one embodiment. The 1st through 8th columns in the 1st through 3rd rows in the ODU intermediate frame are the overhead area. In the overhead area, JC1 through JC6, FAS (Frame Alignment Signal), BIP8 (Bit Interleaved Parity 8), CI (Concatenate Indication), and AF (Alarm Flag) are set. Rsv means reserved (not used). The 1st through 8th columns in the 4th through 7th rows are a reserved area. When the input signals are not ODU4, such as ODU3, the 1st through 8th columns of the 8th through 20th rows are the reserved area. When the input signals are ODU4, the 1st through 8th columns of the 8th to 20th rows are the payload area. Furthermore, the 9th through 768th columns of the 1st to 20th rows are the payload area. The ODU intermediate frame according to the present embodiment has a clock frequency of 164.42 MHz, one frame is 93.42 μs, and the capacity is 76800 bytes.

Figure 7:
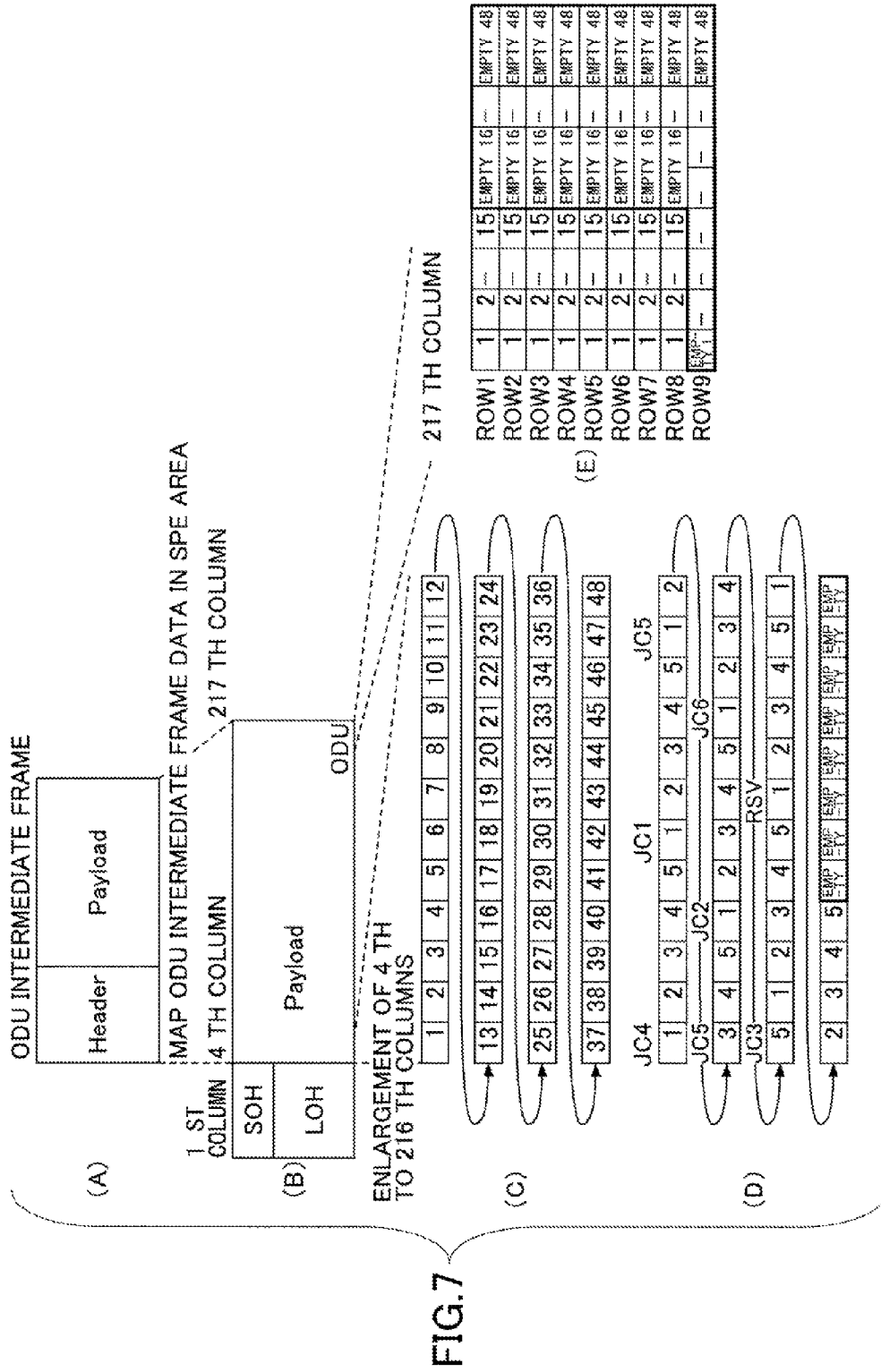
FIG. 7 is for describing the operation of mapping an ODU intermediate frame into an original frame.

The ODU intermediate frames (one frame=76800 bytes) having the format illustrated in FIG. 7(A) output from the intermediate frame mapping units 32-1-1 through 32-n-k are multiplexed into five channels at the original frame mapping units 33-1-1 through 33-n-k, and are mapped into the payload areas of the original frames having the format as illustrated in FIG. 7(B).

An original frame has 9 rows and 217 columns. Similar to SONET, the original frame has an overhead area of SOH and LOH corresponding to three columns. The 4th through 217th columns are the payload area. In the original frame, SOH and LOH are provided to match the format of SONET. One original frame has 93744 bytes, the payload area has 92448 bytes, and the empty space in the payload area is 15648 bytes. The clock frequency of the original frame is 1.003468208 GHz.

One column of the original frame accommodates 48 channels as illustrated in FIG. 7(C). The data of the ODU intermediate frame is mapped into the 1st through 40th channels among these 48 channels. As illustrated in FIG. 7(D), 5 channels of JC4 of the ODU intermediate frame are mapped from the first row, fourth column. Next, 5 channels of JC1, 5 channels of JC5, 5 channels of JC2, 5 channels of JC6, 5 channels of JC3, 5 channels of reserve, and another 5 channels of reserve are mapped, and the 41st through 48th channels are empty spaces.

As illustrated in FIG. 7(E), in the 217th column of the original frame, in the 1st through 8th rows, the 16th through 48th channels are empty spaces, and the entire 9th row is an empty space. This original frame is cross-connected in units of channels at the cross-connect unit 25, with the use of the space switch 25a and the time switch 25b.

Figure 8:
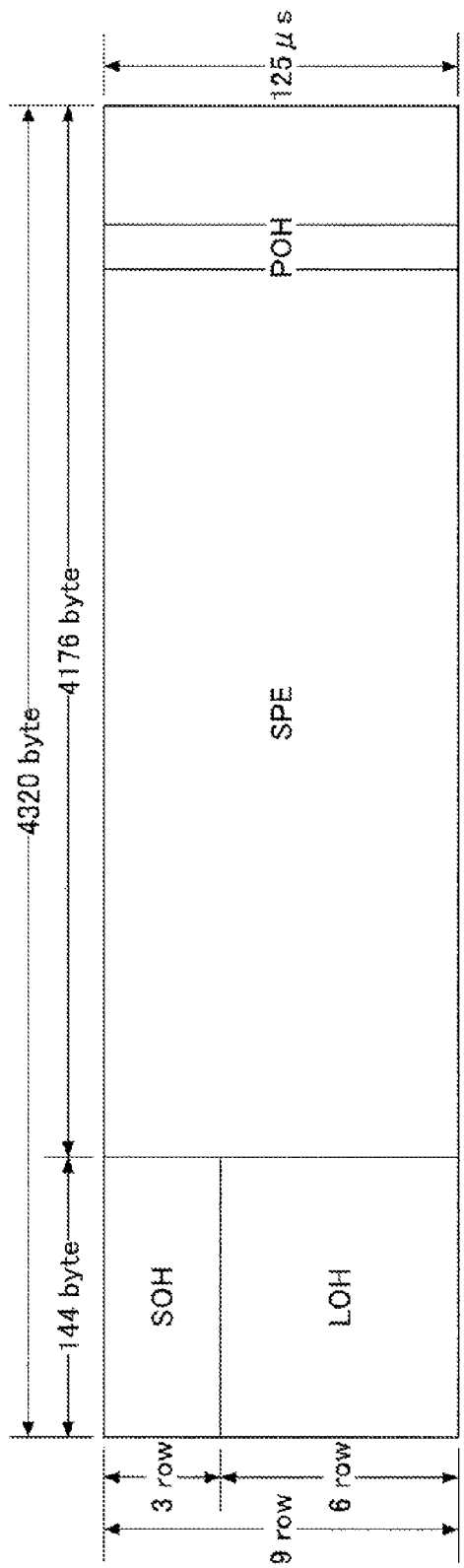
FIG. 8 illustrates a frame format of STS-48.
Figure 9:
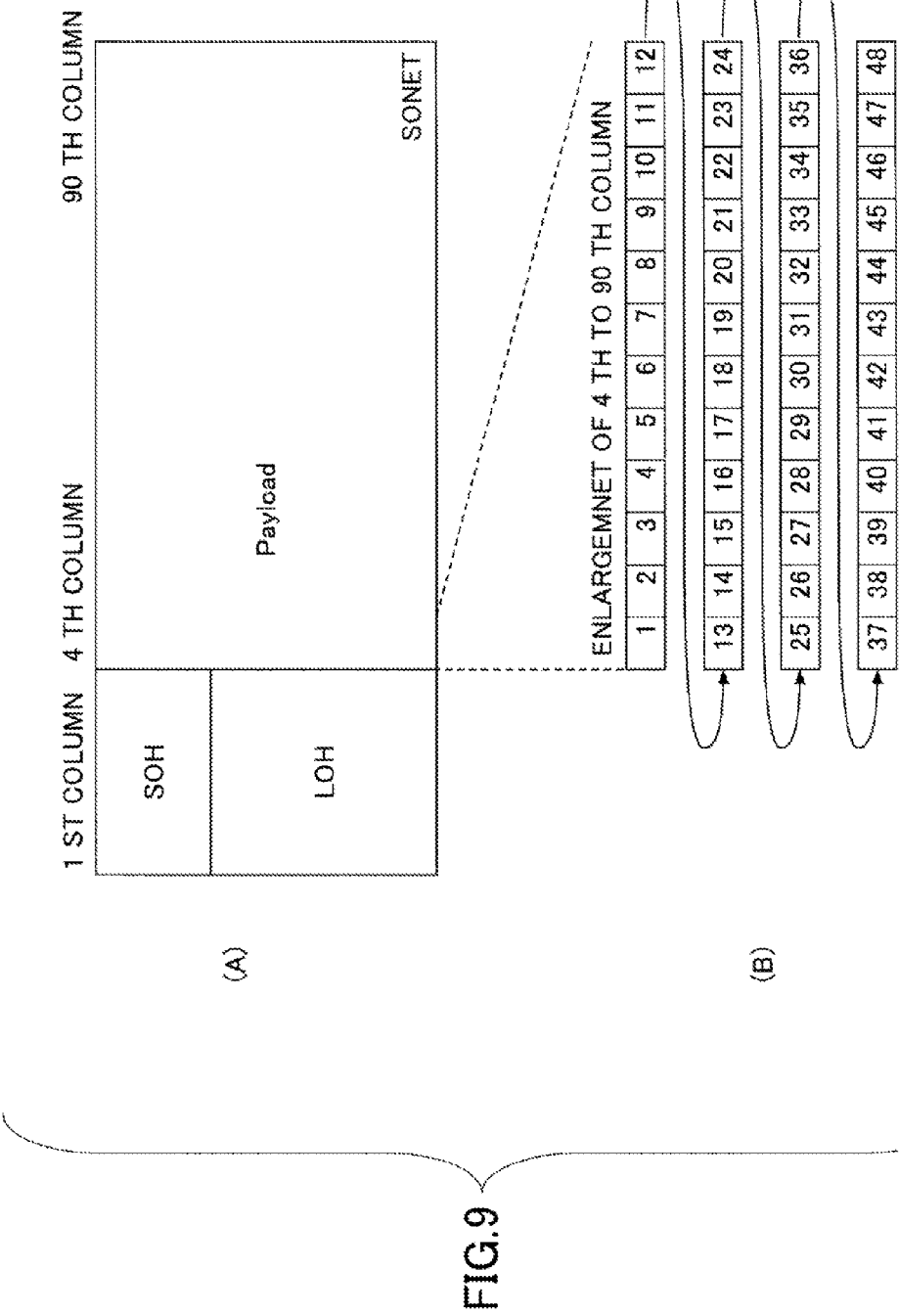
FIG. 9 is for describing the operation of mapping a SONET frame into an original frame.

Meanwhile, STS-48 frames of 2.48832 Gb/s in the format illustrated in FIG. 8 are supplied to the high-speed inf units 22-1 through 22-n on the SONET input side. The STS-48 frames are converted into 8 lines of parallel signals of 311.04 Mb/s corresponding to STS-1, and are supplied to the low-speed inf units 23-1-1 through 23-n-m. The SONET frames output from the low-speed inf units 23-1-1 through 23-n-m have 9 rows and 90 columns as illustrated in FIG. 9(A), and have an overhead area of SOH and LOH corresponding to 3 columns. The 4th through 90th columns are the payload area. One SONET frame is 38880 bytes, and the payload area is 37584 bytes. Furthermore, the clock speed of the SONET frame is 331.04 MHz. One column of a SONET frame accommodates 48 channels as illustrated in FIG. 9(B).

Figure 10:
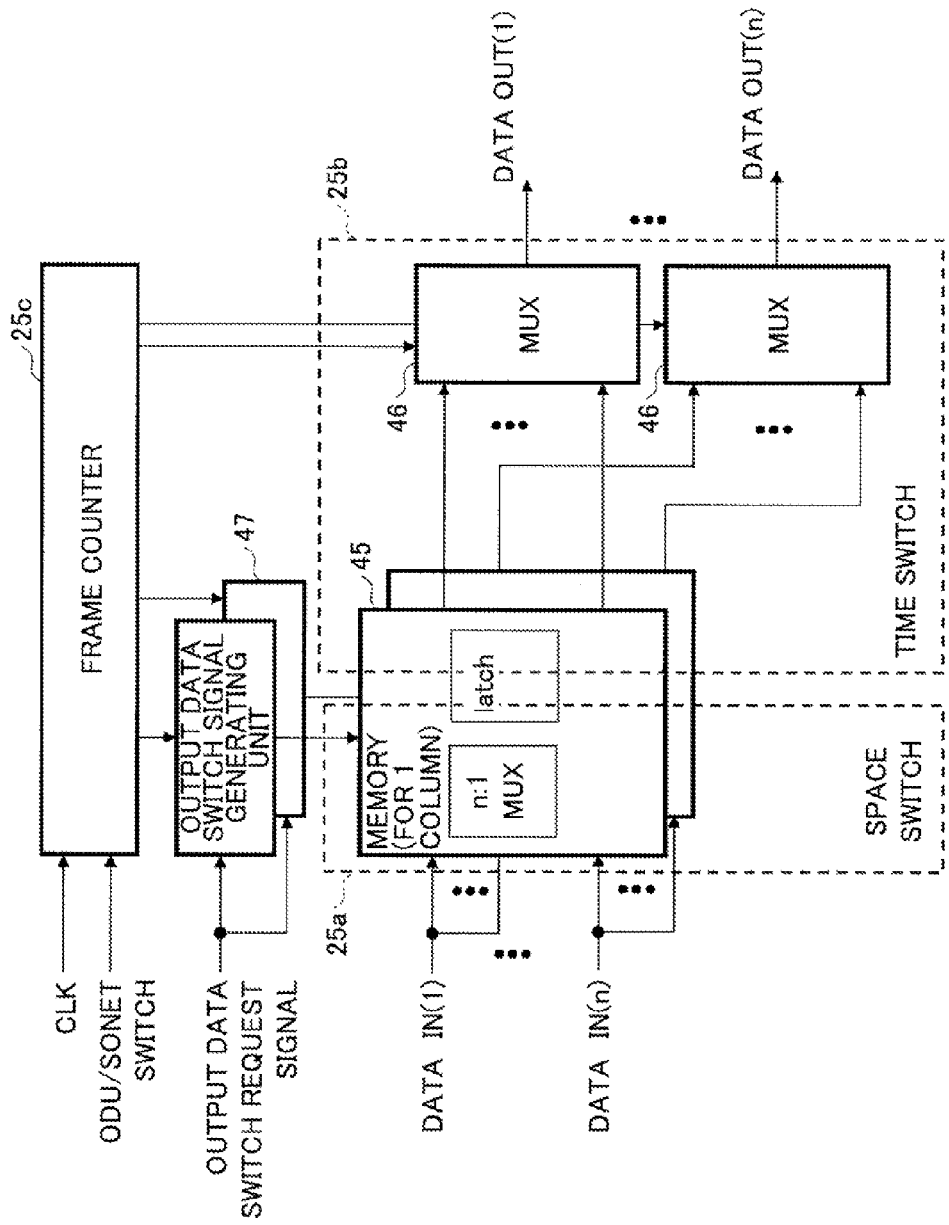
FIG. 10 is a block diagram of a cross-connect unit according to one embodiment.

FIG. 10 is a block diagram of the cross-connect unit 25 according to one embodiment. As illustrated in FIG. 10, the cross-connect unit 25 includes a memory 45 constituting part of the space switch 25a and the time switch 25b, a multiplexer (MUX) 46 constituting the time switch 25b, the frame counter 25c, and an output data switch signal generating unit 47. The frame counter 25c receives clock signals and ODU/SONET switch signals. The number of frames are counted by counting the clock signals when ODU frames are supplied and when SONET frames are supplied. The count values of the frame counter 25c are supplied to the output data switch signal generating unit 47 and the multiplexer 46. The output data switch signal generating unit 47 receives output data switch request signals from the CPU 26, converts the output data switch request signals into data switch control signals, and supplies the data switch control signals to the memory 45.

The memory 45 receives data of SONET frames or original frames corresponding of n lines, from the selectors 24-1 through 24-n. The memory 45 switches the write position according to data switch control signals (multiplexes), and latches the data at the same time (writes). The latched data may be switched (time switched by interchanging time slots) once again according to data switch control signals, at the time when all data items corresponding to one column are ready at the multiplexer 46, and may then be output.

Figure 11:
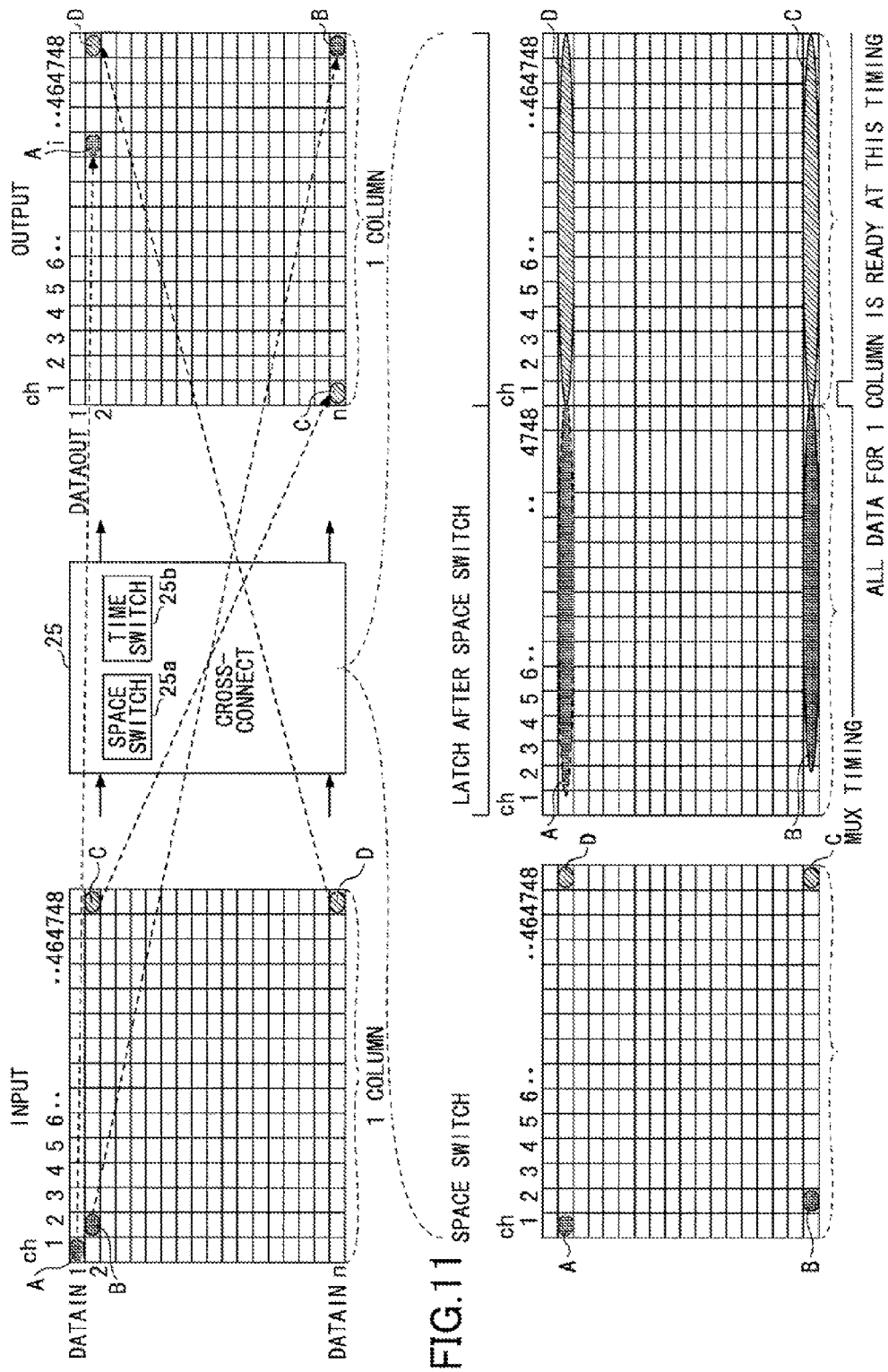
FIG. 11 illustrates cross-connection.

FIG. 11 illustrates the cross-connection performed at the cross-connect unit 25. In FIG. 11, data (A) of channel 1 input to line 1 is switched to line 2 at the space switch 25a and latched, and then switched to channel 1 at the time switch 25b and output. Furthermore, the data (B) of channel 2 input to line 2 is switched to line n at the space switch 25a and latched, and then switched to channel 48 at the time switch 25b and output. Furthermore, the data (C) of channel 48 input to line 2 is switched to line n at the space switch 25a and latched, and then switched to channel 1 at the time switch 25b and output. Furthermore, the data (D) of channel 48 input to line n is switched to line 2 at the space switch 25a and latched, and then switched to channel 48 at the time switch 25b and output.

According to the present embodiment, cross-connection is performed for both SONET signal frames and ODU signal frames with the use of a single cross-connect unit 25.

Cross-Connect System According to Second Embodiment

Figure 12:
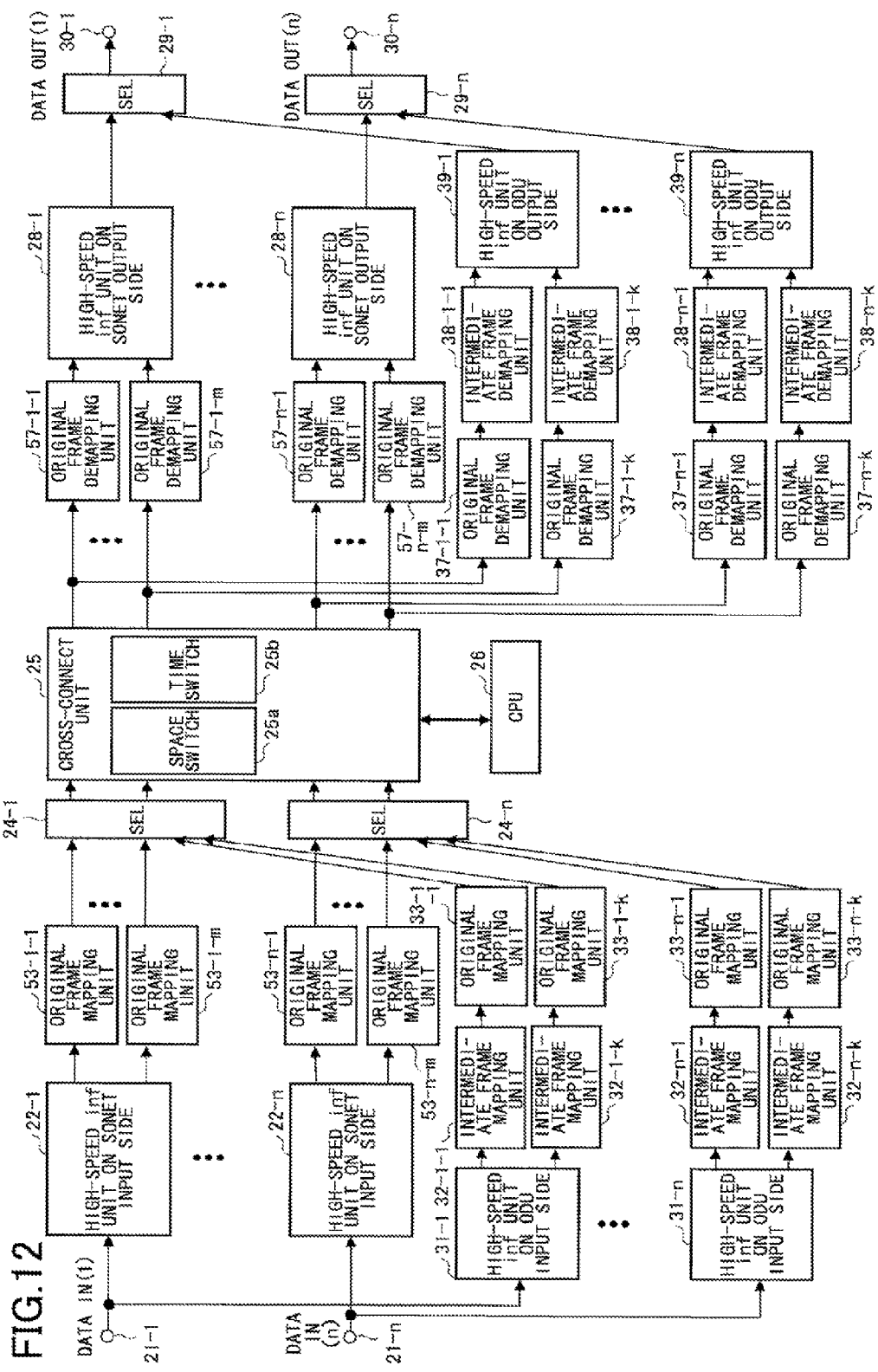
FIG. 12 illustrates an example of a cross-connect system according to a second embodiment in which both SONET and ODU are used.
Figure 13:
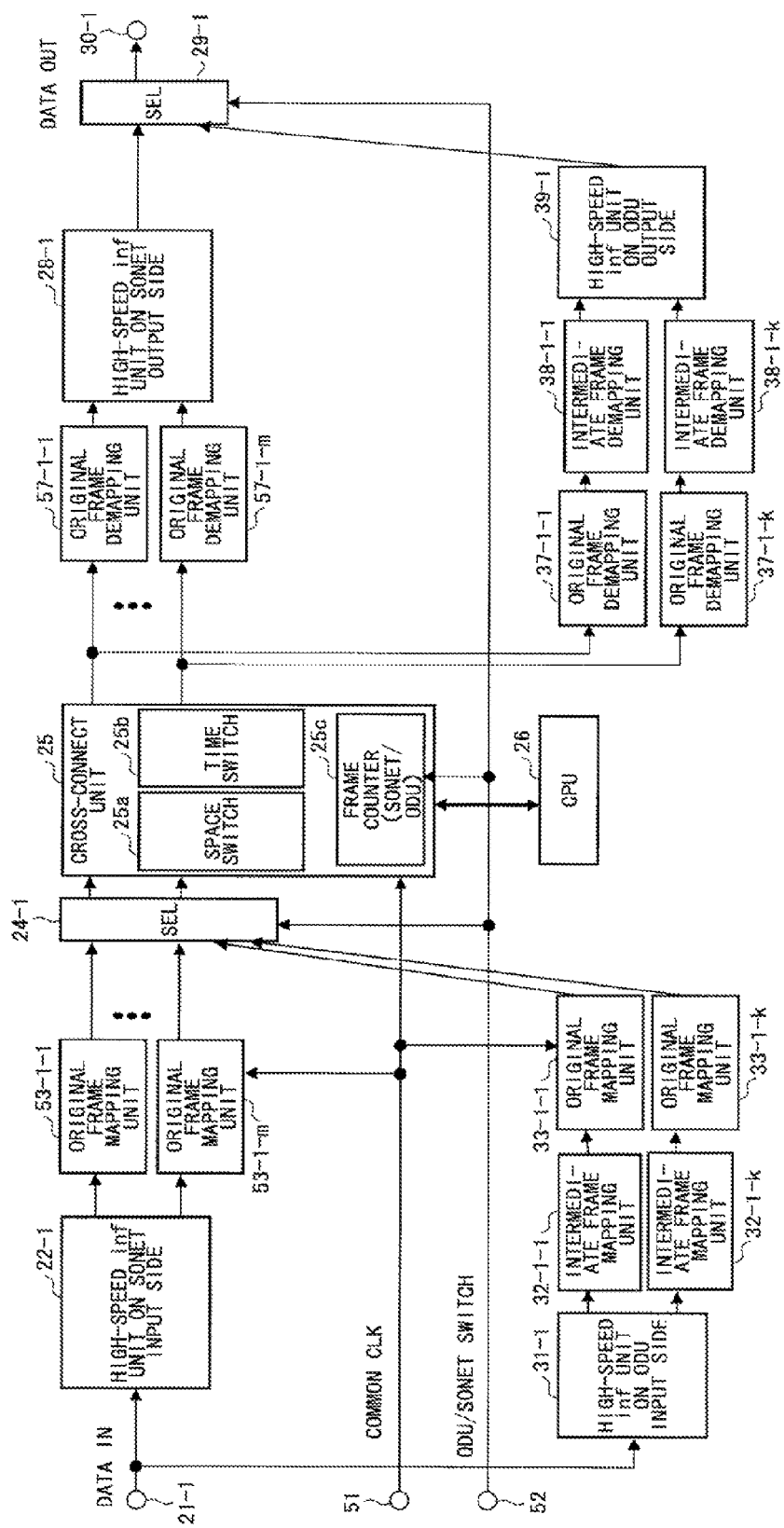
FIG. 13 illustrates a configuration of one input line in FIG. 12.

FIG. 12 illustrates an example of a cross-connect system according to a second embodiment in which both SONET and ODU are used. FIG. 13 illustrates a configuration of one input line in FIG. 12. In another example, SDH may be used instead of SONET.

A description is given of a flow of signals in SONET frames that are first signal frames. In FIG. 12, SONET frames (for example, STS-48) are input from terminals 21-1 through 21-n. At high-speed interface (inf) units 22-1 through 22-n on the SONET input side, the SONET frames are parallel/serial converted. For example, STS-48 of 2.48832 Gb/s is converted into 8 lines of parallel signals of 311.04 Mb/s.

Next, the SONET frames are converted to a format of original frames that are third signal frames, at original frame mapping units 53-1-1 through 53-n-m. This format conversion is performed as follows. The front positions of the frames are aligned to the payload area of original frames that have characteristics of one frame=125 μs, capacity=125280 bytes, clock frequency=1.002240000 GHz. Mapping is performed by adjusting the phases of the plural lines. The original frames output from the original frame mapping units 53-1-1 through 53-n-m are supplied to the cross-connect unit 25 through the selectors 24-1 through 24-n. The above process of aligning the front positions of the frames is performed to facilitate the functions of interchanging channels and interchanging time slots in units of columns at the cross-connect unit 25 at the subsequent stage.

At the cross-connect unit 25, the data items whose front positions have been aligned are input. The cross-connect unit 25 includes the space switch 25a and the time switch 25b. Space switch control and time switch control are performed on the input data in units of columns of 125 μs (clocks of 1.002240000 GHz are frequency-divided by 1/125280), according to data switch control signals based on output data switch request signals from the CPU 26.

The data output from the cross-connect unit 25 is supplied to original frame mapping units 57-1-1 through 57-n-m, and STS-48 frames are regenerated and the frames are transferred onto output side clock signals at 311.04 MHz. At high-speed inf units 28-1 through 28-n on the SONET output side, the signals are parallel/serial converted to 2.48832 Gbps signals of STS-48. Then, the converted signals are output from the terminals 30-1 through 30-n through the selectors 29-1 through 29-n.

Next, a description is given of a flow of signals of ODU frames that are second signal frames. The same description as that of the first embodiment is applicable to ODU frames. For example, OTU4 frames are input from the terminals 21-1 through 21-n, and are converted into ODU intermediate frames described below (164.42 Mb/s×40 parallel), at the high-speed inf units 31-1 through 31-n on the ODU input side and the intermediate frame mapping units 32-1-1 through 32-n-k. The ODU intermediate frames are converted into formats of original frames that are third signal frames, at the original frame mapping units 33-1-1 through 33-n-k. The original frame format conversion is performed by mapping ODU intermediate frames (one frame=93.42 us, capacity=76800 bytes, clock frequency=164.42 MHz) into payload areas of original frames (one frame=93.42 μs, capacity=93627 bytes, clock frequency=1.002240000 GHz). The original frames are supplied to the cross-connect unit 25 through the selectors 24-1 through 24-*n*.

The cross-connect unit 25 performs space switch control and time switch control in units of columns of 93.42 μs (clocks of 1.002240000 GHz are frequency-divided by 1/93627), according to data switch signals based on output data switch request signals from the CPU 26. The original frames output from the cross-connect unit 25 are supplied to the original frame demapping units 37-1-1 through 37-*n-k*, and ODU intermediate frames are regenerated and the ODU intermediate frames are transfer onto output side clock signals at 164.42 MHz. At the intermediate frame demapping units 38-1-1 through 38-*n-k* and the high-speed inf units 39-1 through 39-*n* on the ODU output side convert the original frames into the OTU4 frame format, and the frames are output from the terminals 30-1 through 30-*n* through the selectors 29-1 through 29-*n*.

In FIG. 13, the common clocks (1.002240000 GHz) input from a terminal 51 are supplied to the original frame mapping units 33-1-1 through 33-*n-k* and 53-1-1 through 53-*n-m* and the cross-connect unit 25. The ODU/SONET switch signals input from a terminal 52 are supplied to the selectors 24-1 and 29-1 and the frame counter 25*c* in the cross-connect unit 25.

The ODU intermediate frames (one frame=76800 bytes) having the format as illustrated in FIG. 7(A) output from the intermediate frame mapping units 32-1-1 through 32-*n-k* are multiplexed into five channels at the original frame mapping units 33-1-1 through 33-*n-k*, and are mapped into the payload areas of the original frames having the format as illustrated in FIG. 7(B).

An original frame has 9 rows and 217 columns. Similar to SONET, the original frame has an overhead area of SOH and LOH corresponding to three columns. The 4th through 217th columns are the payload area. In the original frame, SOH and LOH are provided to match the format of SONET. One original frame has 93744 bytes, the payload area has 92448 bytes, and the empty space in the payload area is 15648 bytes. The clock frequency of the original frame is 1.002240000 GHz.

One column of the original frame accommodates 48 channels as illustrated in FIG. 7(C). The data of the ODU intermediate frame is mapped into the 1st through 40th channels among these 48 channels. As illustrated in FIG. 7(D), 5 channels of JC4 of the ODU intermediate frame are mapped from the first row, fourth column. Next, 5 channels of JC1, 5 channels of JC5, 5 channels of JC2, 5 channels of JC6, 5 channels of JC3, 5 channels of reserve, and another 5 channels of reserve are mapped, and the 41st through 48th channels are empty spaces.

As illustrated in FIG. 7(E), in the 217th column of the original frame, in the 1st through 8th rows, the 16th through 48th channels are empty spaces, and the entire 9th row is an empty space. This original frame is cross-connected in units of channels at the cross-connect unit 25, with the use of the space switch 25*a* and the time switch 25*b*. The operation of mapping the ODU intermediate frames into the original frames in the present embodiment are the same as that of the first embodiment, except that the clock frequencies are different.

Figure 14:
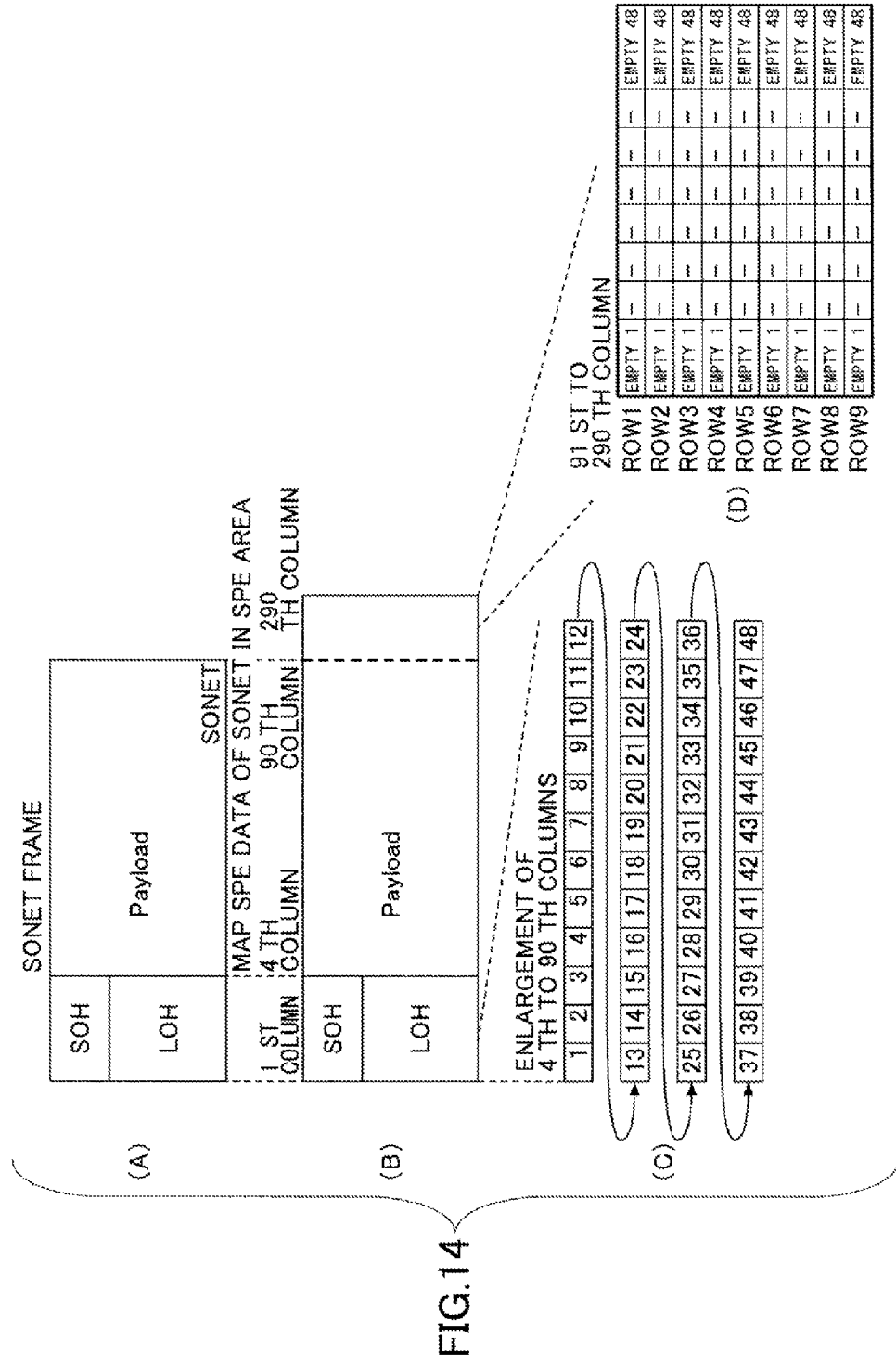
FIG. 14 is for describing the operation of mapping a SONET frame into an original frame.

Meanwhile, STS-48 frames of 2.48832 Gb/s in the format illustrated in FIG. 8 are supplied to the high-speed inf units 22-1 through 22-*n* on the SONET input side. The STS-48 frames are parallel converted into 8 of 311.04 Mb/s corresponding to STS-1, and are supplied to the low-speed inf units 23-1-1 through 23-*n-m*. The SONET frames output from the low-speed inf units 23-1-1 through 23-*n-m* have 9 rows and 90 columns as illustrated in FIG. 14(A), and have an overhead area of SOH and LOH corresponding to 3 columns. The 4th through 90th columns are the payload area. One SONET frame is 38880 bytes, and the payload area is 37584 bytes.

The original frames of the present embodiment have 9 rows and 290 columns as illustrated in FIG. 14(B). In the original frame illustrated in FIG. 7(B), one SONET frame is 93.42 μs and therefore there are 9 rows and 217 columns. However, in the original frame illustrated in FIG. 14(B), one SONET frame is 125 μs and therefore there are 9 rows and 290 columns.

Similar to SONET, the original frame in FIG. 14(B) have an overhead area of SOH and LOH corresponding to 3 columns. The 4th through 290th columns are the payload area. In the original frame, SOH and LOH are provided to match the format of SONET. One original frame has 125280 bytes, the payload area has 123984 bytes, and the empty space in the payload area is 86400 bytes. The clock frequency of the original frame is 1.002240000 GHz. One column of an original frame accommodates 48 channels as illustrated in FIG. 14(C).

The SONET frame in FIG. 14(A) (9 rows, 90 columns) is mapped into the 9 rows and 90 columns of the original frame in FIG. 14(B). In the 91st through 290th columns of the original frame, the 1st through 48th channels are empty spaces as illustrated in FIG. 14(D).

As described above, in a cross-connect system in which plural types of signal frames (SONET/ODU) are used in the same system, a common cross-connect unit can be used for implementing cross-connection, without the need of providing cross-connect units for the respective types of signal frames.

Accordingly, the circuit scale of the cross-connect unit can be reduced to approximately two-thirds of that of the conventional technology, thus reducing power consumption and cost. Furthermore, the cross-connection method is TDM, and therefore even if the circuit capacity increases, extensions can be easily made.

Furthermore, in the cross-connect unit, by using the original frame format, new services (such as alarm transfer) can be added by using the empty bytes in the frame format. Furthermore, because the ports to the cross-connect unit are not used exclusively for a particular signal type, the cross-connect unit is capable of receiving and processing different types of input signals.

According to an aspect of the present invention, cross-connection can be performed for plural types of signal frames by using a single cross-connection unit.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cross-connect system for performing cross-connection for first signal frames and cross-connection for second signal frames, the cross-connect system comprising:

a cross-connection unit including a space switch and a time switch and configured to perform cross-connection for signal frames using both of the space switch and the time switch, wherein the first signal frames have a first clock frequency and are a type of signal frames for which cross-connection is performed using the time switch and the space switch, and the second signal frames are a type of signal frames for which cross-connection is performed using only the space switch;

a mapping unit configured to map the second signal frames into third signal frames that have a second clock frequency different from the first clock frequency and for which cross-connection is performed using the time switch and the space switch; and a selection unit configured to select one of a combination of the first signal frames and clock signals with the first clock frequency and a combination of the third signal frames and clock signals with the second clock frequency and to supply the selected combination to the cross-connection unit, wherein the cross-connection unit is configured to perform cross-connection for one of the first signal frames and the third signal frames selected by the selection unit by using both of the space switch and the time switch; and a demapping unit configured to demap the third signal frames output from the cross-connection unit into the second signal frames and output the second signal frames.

2. The cross-connect system according to claim 1, wherein the mapping unit is configured to map the second signal frames into fourth signal frames whose signal speed is fixed, and then map the fourth signal frames into the third signal frames.

3. A cross-connect system for performing cross-connection for first signal frames and cross-connection for second signal frames, the cross-connect system comprising:

a cross-connection unit including a space switch and a time switch and configured to perform cross-connection for signal frames using both of the space switch and the time switch, wherein the first signal frames are a type of signal frames for which cross-connection is performed using the time switch and the space switch, and the second signal frames are a type of signal frames for which cross-connection is performed using only the space switch;

a first mapping unit configured to transfer the first signal frames onto common clock signals and map the first signal frames into third signal frames for which cross-connection is performed using the time switch and the space switch;

a second mapping unit configured to transfer the second signal frames onto the common clock signals and map the second signal frames into the third signal frames;

a selection unit configured to select either the third signal frames output from the first mapping unit or the third signal frames output from the second mapping unit and supply the selected third signal frames to the cross-connection unit, wherein the cross-connection unit is configured to perform cross-connection for the third signal frames selected by the selection unit by using both of the space switch and the time switch;

a first demapping unit configured to demap the third signal frames output from the cross-connection unit into the first signal frames and output the first signal frames; and a second demapping unit configured to demap the third signal frames output from the cross-connection unit into the second signal frames and output the second signal frames.

4. The cross-connect system according to claim 3, wherein the second mapping unit is configured to map the second signal frames into fourth signal frames whose signal speed is fixed, and then map the fourth signal frames into the third signal frames.

5. A cross-connect method for performing cross-connection for first signal frames and cross-connection for second signal frames with a cross-connect system including a cross-connection unit that includes a space switch and a time switch and performs cross-connection for signal frames using both of the space switch and the time switch, wherein the first signal frames have a first clock frequency and are a type of signal frames for which cross-connection is performed using the time switch and the space switch, and the second signal frames are a type of signal frames for which cross-connection is performed using only the space switch, the cross-connect method comprising:

mapping the second signal frames into third signal frames that have a second clock frequency different from the first clock frequency and for which cross-connection is performed using the time switch and the space switch;

selecting one of a combination of the first signal frames and clock signals with the first clock frequency and a combination of the third signal frames and clock signals with the second clock frequency and supplying the selected combination to the cross-connection unit;

performing, by the cross-connection unit, cross-connection for one of the first signal frames and the third signal frames selected at the selecting by using both of the space switch and the time switch; and demapping the third signal frames that have been cross-connected into the second signal frames and outputting the second signal frames.

6. A cross-connect method for performing cross-connection for first signal frames and cross-connection for second signal frames with a cross-connect system including a cross-connection unit that includes a space switch and a time switch and performs cross-connection for signal frames using both of the space switch and the time switch, wherein the first signal frames are a type of signal frames for which cross-connection is performed using the time switch and the space switch, and the second signal frames are a type of signal frames for which cross-connection is performed using only the space switch, the cross-connect method comprising:

transferring the first signal frames onto common clock signals and mapping the first signal frames into third signal frames for which cross-connection is performed using the time switch and the space switch;

transferring the second signal frames onto the common clock signals and mapping the second signal frames into the third signal frames;

selecting either the third signal frames in which the first signal frames are mapped or the third signal frames in which the second signal frames are mapped and supplying the selected third signal frames to the cross-connection unit;

performing, by the cross-connection unit, cross-connection for the third signal frames selected at the selecting by using both of the space switch and the time switch; and demapping the third signal frames that have been cross-connected into the first signal frames or the second signal frames and outputting the first signal frames or the second signal frames.

7. The cross-connect system according to claim 2, wherein the demapping unit is configured to demap the third signal frames into the fourth signal frames, and then demap the fourth signal frames into the second signal frames.

8. The cross-connect system according to claim 4, wherein the second demapping unit is configured to demap the third signal frames into the fourth signal frames, and then demap the fourth signal frames into the second signal frames.

* * * * *